United States Patent [19]

Osborne

[11] Patent Number: 5,277,827
[45] Date of Patent: Jan. 11, 1994

[54] OIL WATER SEPARATOR SYSTEM

[76] Inventor: William T. Osborne, 2444 - 205th St., No. 4, Torrance, Calif. 90501

[21] Appl. No.: 986,122

[22] Filed: Dec. 4, 1992

[51] Int. Cl.$^5$ ............................................. B01D 17/038
[52] U.S. Cl. ...................................... 210/787; 184/1.5; 210/168; 210/241; 210/259; 210/424; 210/805; 210/806
[58] Field of Search ............. 210/168, 172, 171, 360.1, 210/259, 241, 787, 799, 805, 806, 138, 424; 184/1.5, 16, 14

[56] References Cited

U.S. PATENT DOCUMENTS

| | | | |
|---|---|---|---|
| 2,324,763 | 7/1943 | Carruthers | 210/787 |
| 3,029,898 | 4/1962 | Fraser | 184/1.5 |
| 3,933,638 | 1/1976 | Isley | 210/168 |
| 3,954,611 | 5/1976 | Reedy | 210/244 |
| 4,431,540 | 2/1984 | Budzich | 210/360.1 |
| 4,534,866 | 8/1985 | Becker | 210/697 |
| 4,591,433 | 5/1986 | Budzich | 210/167 |
| 5,026,488 | 6/1991 | Mesheau | 210/799 |
| 5,158,677 | 10/1992 | Hewitt et al. | 210/360.1 |

*Primary Examiner*—Joseph W. Drodge
*Attorney, Agent, or Firm*—Arthur Freilich; Robert D. Hornbaker; Leon D. Rosen

[57] ABSTRACT

Apparatus is described for use in an industrial plant that contain machines (14) having oil reservoirs (12), which facilitates cleaning of the oil. The apparatus includes a stand (20) and equipment mounted on the stand, including input and output hoses (36,38) whose ends can be dropped into a machine oil reservoir. The equipment on the stand also includes a centrifuge (24), pump (26), valve (34), and porous filter device (40). In a first mode of operation, the pump draws oil from the reservoir to flow through the input hose into the centrifuge, and then to the output hose to flow back to the reservoir. The valve can be switched to a second mode wherein fluid from the input hose is directed through the pump to the porous filter device, for final cleaning of the oil before returning it to the reservoir. The stand has wheels to enable it to roll to another machine and clean its oil.

4 Claims, 2 Drawing Sheets

OIL WATER SEPARATOR SYSTEM

BACKGROUND OF THE INVENTION

Many industrial plants contain machines with hydraulic actuators, and with oil reservoirs where the hydraulic fluid, or oil, is stored. The oil becomes contaminated with dirt during use, and becomes contaminated with water especially due to condensation when the machine is not used at night and on weekends. One approach to cleaning the oil is to provide a dedicated cleaning system for the machine, such as a centrifugal pump which separates water and dirt from oil. U.S. Pat. No. 4,431,540 by Budzich shows a system of this type. However, this can add substantially to the space requirements and cost of the machine. An oil cleaning system for an industrial plant, which minimized the space requirements and cost for oil cleaning and which enabled very extensive cleaning when necessary, would be of considerable value.

SUMMARY OF THE INVENTION

In accordance with one embodiment of the present invention, an apparatus and method are provided for the cleaning of the oil reservoirs of machines in an industrial plant, which minimizes the costs and enables cleaning to a range of oil purities. The system includes a stand and equipment thereon which includes a centrifuge, pump device, directional valve, input and output hoses, and porous filter device. The stand is placed adjacent to a machine oil reservoir and the hoses are dropped into the reservoir from its open top. The valve device is switched to a first state and the equipment operated to pump oil out of the reservoir and through the centrifuge where water and dirt is removed, with the clean oil delivered back to the reservoir. The centrifuge is operated continually until the amount of oil that has passed through the centrifuge for cleaning, is a plurality of times greater than the capacity of the oil reservoir, and preferably at least ten times as great. The valve is then operated in a second state, where oil is drawn out of the reservoir through the inlet hose and pumped to the porous filter device where the last bits of contaminants are removed, the very clean oil then being discharged back to the reservoir. The stand preferably has rollers, so that after processing oil in one machine reservoir, the apparatus can be rolled to another machine to process its oil.

The novel features of the invention are set forth with particularity in the appended claims. The invention will be best understood from the following description when read in conjunction with the accompanying drawings.

DESCRIPTION OF THE PREFERRED EMBODIMENT

Figure 1:
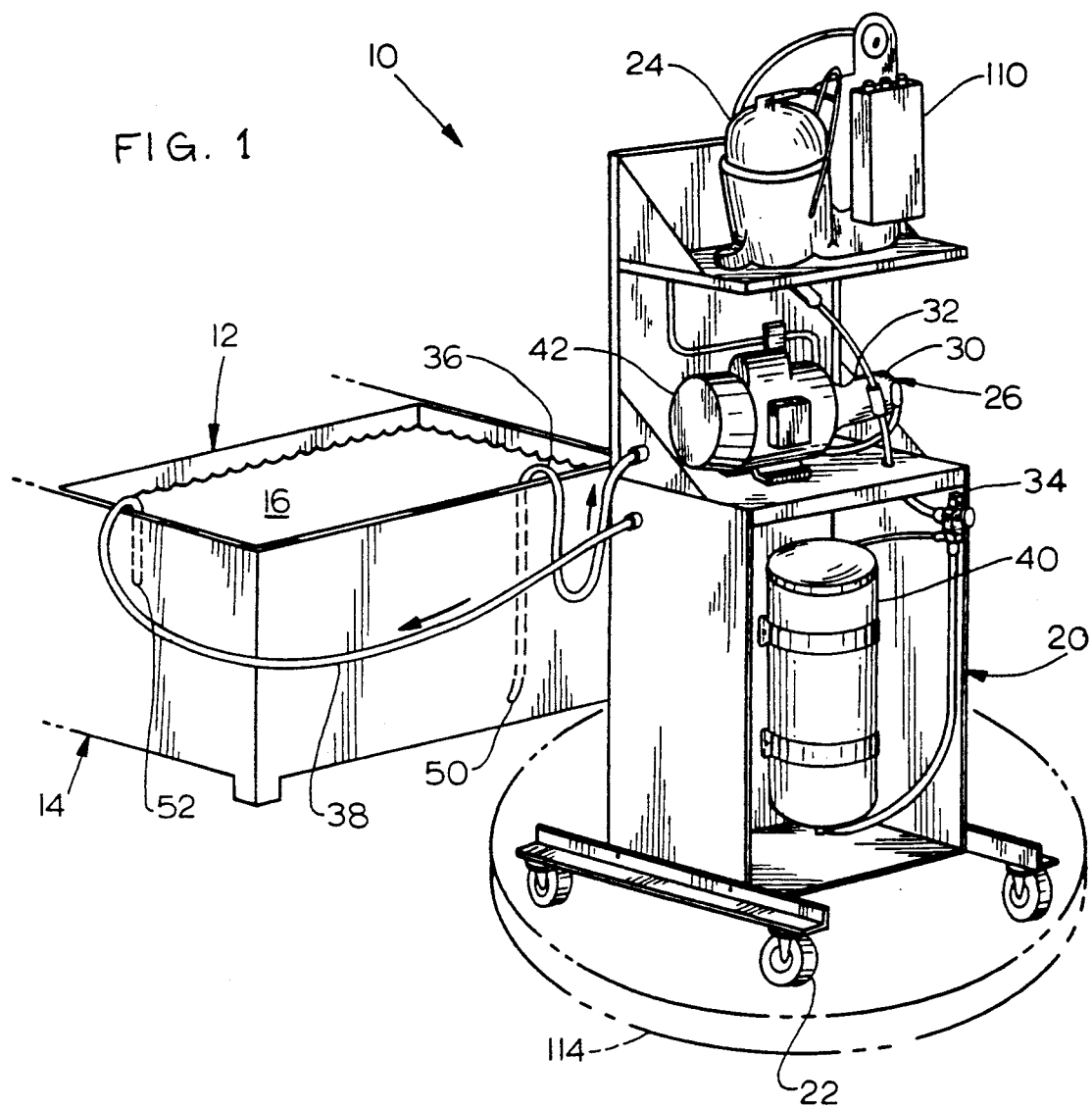
FIG. 1 is an isometric view of oil cleaning apparatus, shown in conjunction with the oil reservoir of a machine tool.

FIG. 1 illustrates an oil cleaning apparatus (10) which is shown used in conjunction with a tank or reservoir (12) of a machine tool (14). The machine tool, such as an injection molding press which has hydraulic actuators, includes a large oil reservoir (12) to enable hot oil to cool before it is reused in the actuators. The oil (16) becomes contaminated through dirt such as particles picked up from the actuators and the environment, and from water that condenses when the heated machine cools when the factory is unheated as at night or on weekends. The reservoir (12) normally has a cover over the top, which has been removed.

The oil cleaning apparatus (10) includes a stand (20) which lies on rollers (22) to enable the stand and equipment thereon to be readily moved around the industrial plant. Equipment mounted on the stand includes a centrifuge (24), a pump device (26) that includes first and second pumps (30), (32), a directional valve device (34) with two inlets and four outlets, input and output hoses (36), (38), and a porous filter device (40). An electrically energized motor (42) of the pump device, receives power through a cable, not shown, and is the only piece of equipment that is energized by an external power source.

Figure 2:
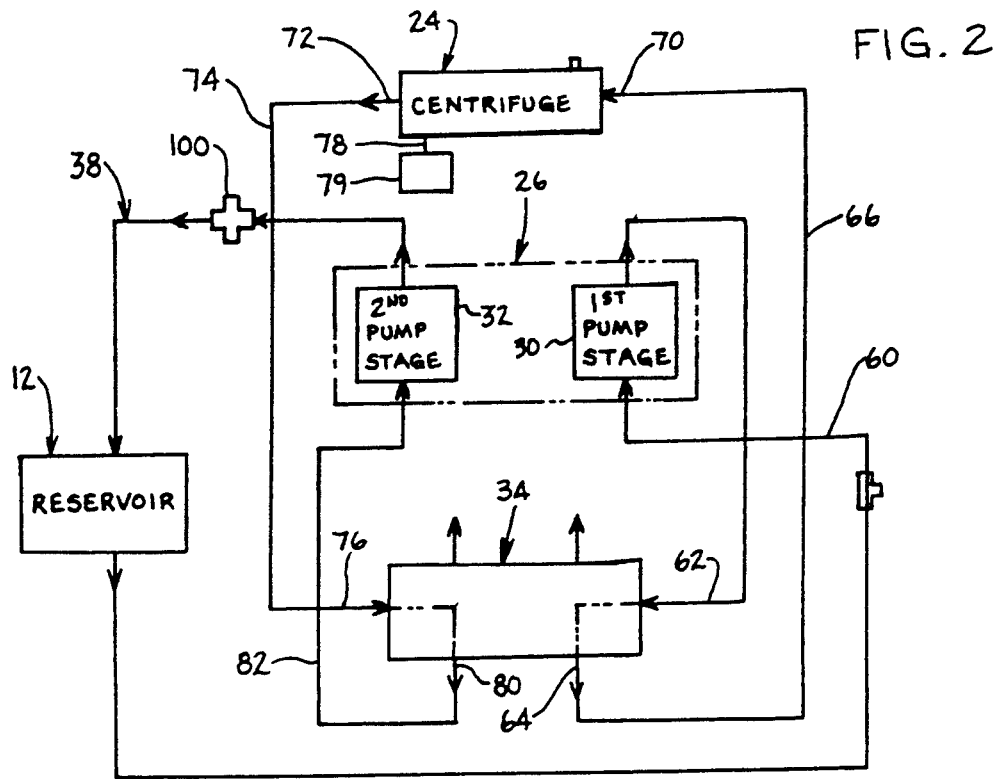
FIG. 2 is a diagrammatic view of the oil cleaning apparatus of FIG. 1, with the directional valve device in a first state.

To clean the oil in the reservoir (12) of the machine tool, applicant rolls the cleaning apparatus (10) to the vicinity of the reservoir and drops the outer ends (50), (52) of the input and output hoses into the reservoir. Preferably, the end (50) of the input hose lies near the bottom of the pool of oil of the reservoir near one end thereof, while the outer end (52) of the output hose lies near the top of the reservoir or pool near an opposite end thereof. The flexible hoses preferably each have a length of at least one meter, to easily reach into a reservoir. To start the cleaning operation, applicant operates the directional valve (34) to make the connections shown in FIG. 2. In FIG. 2, oil from the reservoir passes out through the input hose (36) and a conduit (60) to the first stage suction pump (30), and from the pump to a first inlet port (62) of the directional valve. With the valve in the first state shown, the pumped fluid from the reservoir flows out through a first valve outlet (64) and through a conduit (66) to an oil inlet (70) of the centrifuge. Fairly well cleaned oil, wherein most of the original contaminants including water has been removed, flows out of the centrifuge oil outlet (72) and through a conduit (74) to a second valve inlet (76). Water and dirt flow out of the centrifuge through another centrifuge outlet (78) to a holding tank (79). With the valve in its first state, oil from the centrifuge flows out of a second valve outlet (80) through a conduit (82) to the second stage pump (32) and flows from the second stage pump along the output hose (38) back to the reservoir (12).

The centrifuge may be of the type described in U.S. Pat. No. 4,431,540, which uses pressured oil pumped to a moderate pressure, such as up to 70 psi, by the first stage pump (30). Clean oil exiting from the centrifuge exits through jets which drive the centrifuge. Such centrifuges are available, which have an internal oil storage volume of about 0.5 gallons, and which have a through-put of about 3 gallons per minute. A common industrial hydraulic tool may have a reservoir of perhaps one hundred gallons to always provide cool oil. After about one half hour of operation of the centrifuge, about one hundred gallons of oil will have flowed through the centrifuge.

If applicant were to store all of the centrifuged oil before returning it to the machine tool reservoir, then after perhaps one half hour, all of the oil in the reservoir would have been moderately cleaned, and this oil could be dumped back into the reservoir. However, it is not usually practical to store the cleaned oil before returning it, because it is desirable to maintain a large level of oil in the reservoir during cleaning of the oil, to enable the machine tool to operate while the cleaning operation proceeds. Also, additional bulky equipment would be required to store the clean oil before dumping it back into the reservoir. Instead, applicant runs the centrifuge a plurality of times more than the above-mentioned period of thirty minutes, to clean an amount of oil which is a plurality of times the reservoir capacity. Preferably, applicant runs the centrifuge for at least 5 hours, so that at least ten times as much oil has passed through the centrifuge as the amount of oil (100 gallons) in the reservoir. Although the cleaned oil returned to the reservoir constantly mixes with some dirty oil left in the reservoir, the large flow of oil through the centrifuge, combined with placing the hose ends at different ends of the reservoir, results in a high proportion such as 95%, of the oil in the reservoir being as clean as the output of the centrifuge. The remaining perhaps 5% of initially unclean oil, causes only mild contamination of the clean oil.

Figure 3:
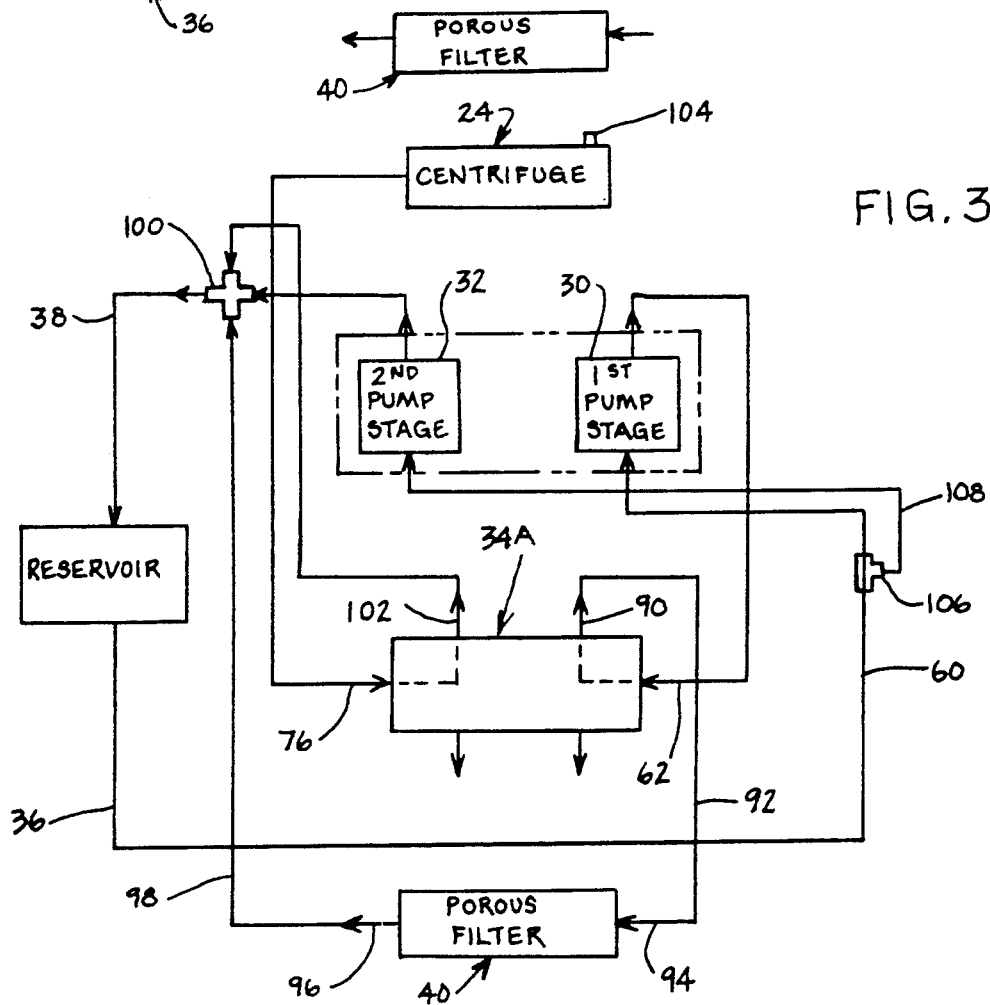
FIG. 3 is a view similar to that of FIG. 2, but with the directional valve in a second state.

FIG. 3 shows the equipment wherein the directional valve at 34A has been switched to its second state. In the second state, oil is drawn from the reservoir through the input hose (36) by the first stage pump (30). Oil flows from the pump into the first inlet port (62) of the valve and out through a third outlet port (90) of the valve and through a conduit (92) to the inlet (94) of the porous filter (40). The porous filter (40) is of the type used in automobiles and trucks and which is packed with porous filter material, except that the particular porous filter (40) is larger than most vehicle filters and the filter is constructed to remove water and to remove particulates greater than 0.5 microns. Very clean oil exits from the porous filter through its outlet (96), and flows through a conduit (98) to a manifold (100) that connects to the output hose (38) that delivers the clean oil back to the reservoir (12). The flow rate through the particular filter 40, used with the above-described centrifuge, is about 3.0 to 4.0 gallons per minute.

While the porous filter (40) produces extremely clean oil, the filter quickly becomes clogged if the oil flowing into the filter has a lot of contaminants such as dirt or water. The presence of the centrifuge (24) to remove most of the contaminants from the reservoir, prior to the relatively clean oil in the reservoir passing through the porous filter, results in a long life for the porous filter. A long life is desirable to minimize the considerable cost for the porous filter, and to save on the labor required in replacing the porous filter.

It may be noted that when the directional switch is in its second state shown at 34A, oil left in the centrifuge (24) at the moment of switching passes through the second valve inlet (76) and out through a fourth valve output port (102) to the manifold (100). At that time, a bleeder valve (104) on the centrifuge opens, to allow oil to drain out of the centrifuge, the oil being drawn out partially by being drawn into the flow of oil through the manifold (100). It also should be noted that a coupling (106) is located along the inlet conduit (60), so that some of the oil drawn from the reservoir passes through conduit (108) through the second stage pump (32) to flow to the manifold, without passing through the porous filter. The reason for pumping oil through the second stage pump (32), is to keep the pump (32) constantly lubricated with oil in a simple manner, to avoid wear.

Where the reservoir contains perhaps one hundred gallons of oil, a plurality of hundreds of gallons and preferably at least one thousand gallons, is pumped through the porous filter to provide very clean oil for the reservoir. The valve (34) shown in FIG. 1, can be manually operated, and also can be set to be operated by a control box (110) which has controls that keep the valve in its first stage for a predetermined period such as 5 hours, and then automatically switches the valve to the second stage and operates it for another period such as another 5 hours, and then shuts off the electric motor (42) which is the sole externally energized part of the apparatus. After oil in the reservoir (12) has been cleaned, and a worker notices that the machine has shut down after the appropriate period of time, a worker can then pull out the hoses from the reservoir and wipe oil off their ends. The worker then rolls the stand or frame with the equipment thereon to another machine tool, and drops the hose ends into the reservoir thereof to clean the oil of that reservoir.

In some localities a dam, indicated at 114, is required around oil processing apparatus. Applicant can establish a single dam (114), as by placing the dam on the stand or rolling the stand over an edge of the dam, using a relatively small dam, because all the processing equipment is mounted on a single stand.

Thus, the invention provides apparatus for cleaning oil, and especially for separating water from the oil, which can be readily used in an industrial plant. This is accomplished by mounting various equipment on a single stand, with flexible hoses that can be dropped into a reservoir of a machine tool. The equipment preferably includes a directional valve, a centrifuge, a pump device with at least one pump, input and output hoses, and a porous filter device. In one state of the valve, oil from the reservoir is passed through the centrifuge for relatively good cleaning. The amount of oil passed through the reservoir is preferably a plurality of times greater than the pool of oil in the reservoir and preferably at least ten times as great, to effectively clean the oil without having to separately store all of the reservoir oil before dumping it back into the reservoir. The valve can be set in either of two stages, so that after centrifuging the oil, the oil can be repeatedly passed through the porous filter for fine cleaning.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus adapted for cleaning a quantity of oil lying in each reservoir of each of a plurality of machines, where the oil in each reservoir is contaminated with water and dirt, comprising:

a stand which can be moved from one of said machines to another one of them;

a centrifuge mounted on said stand, said centrifuge having an oil inlet and an oil outlet;

a pump device that includes at least one pump mounted on said stand;

a directional valve device which is switchable between first and second states;

an input hose for receiving oil from said reservoirs;

an output hose for discharging oil to said reservoirs;

a porous filter device of the type that contains packed porous filter material, said filter device having an inlet and outlet;

said centrifuge, pump, valve device and hoses being connected so when said valve device is in said first state, said input hose is connected through said pump device and valve to said centrifuge inlet to draw oil from one of said reservoirs and deliver it to said centrifuge, and said centrifuge oil outlet is connected through said valve device to said output hose to deliver oil directly back to said one reservoir;

said filter device, pump, valve device, and hoses being connected so when said valve device is in said second state, said input hose is connected through said pump device and valve to said filter device to draw oil from said one reservoir and deliver it to said filter device, said filter device outlet being connected to said output hose to deliver oil directly back to said one reservoir substantially without having passed through said centrifuge.

2. The apparatus described in claim 1 wherein:

said stand has wheels to enable it to be rolled to different one of said machines;

said input and output hoses extend far enough to enable connection to the reservoir of any of said machines by dropping each hose down from the top of the connected reservoir into the pool of oil therein; and including a control which operates said valve device in said first state for a sufficient period to pass oil from said any of said machine reservoirs through said centrifuge and back to the machine reservoir at least 10 times, before switching to said second state.

3. A method for cleaning the oil reservoir of machines in an industrial plant, comprising:

rolling a frame that holds a centrifuge, pump, valve, and porous filter, along the floor to a first of said machines;

dropping the ends of first and second hoses into the reservoir of said first machine;

operating said pump to flow oil through said first hose and valve to said centrifuge while operating said centrifuge to separate water from the oil and produce cleaned oil, and flowing cleaned oil from said centrifuge through said second hose back to said reservoir, until the quantity of oil which has passed through said centrifuge is a plurality of times greater than the amount of oil in said reservoir;

after performing said step of flowing oil from and back to said reservoir through said centrifuge, operating said valve to flow oil from said reservoir through said porous filter and then back to said reservoir, while leaving said centrifuge substantially unoperated such that substantially all oil flowing through said filter doe snot flow through said centrifuge;

pulling said hose ends out of said reservoir of said first machine, rolling said frame to a second one of said machines, and dropping said hose ends into the reservoir of said second machine.

4. The method described in claim 3 wherein:

said step of operating said pump to flow oil through said hoses, valve and centrifuge, includes operating said pump continually for a long enough period that the quantity of oil which has passed through said centrifuge is at least 10 times as great as the amount of oil initially in said reservoir.

* * * * *